Oct. 8, 1929.  C. GOETHE  1,731,004
CASSETTE
Filed Nov. 25, 1925
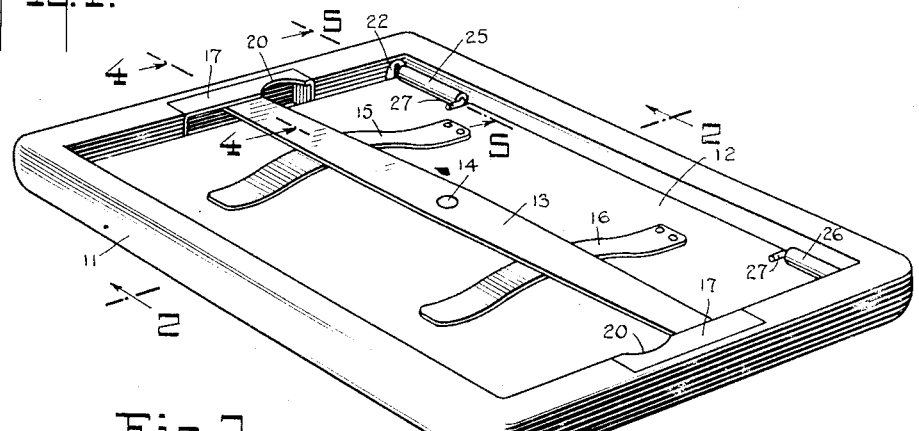
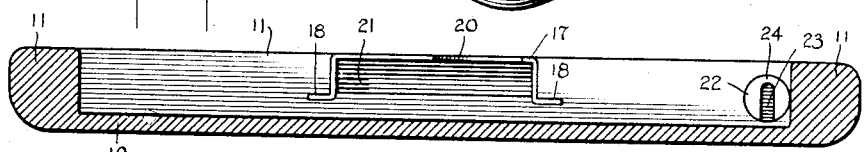
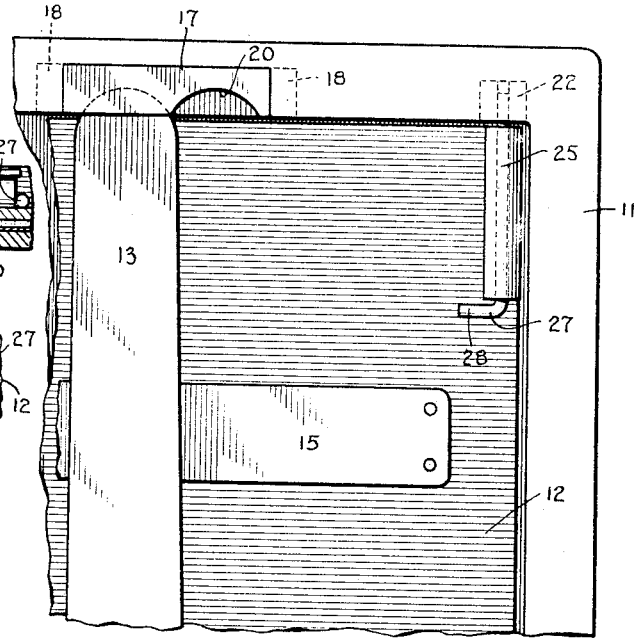
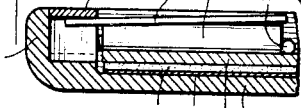
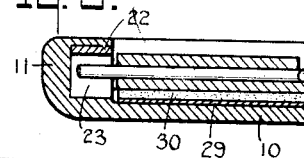
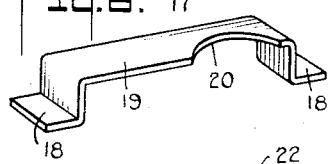
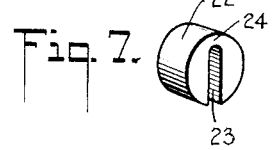
INVENTOR
*Carl Goethe*
BY
*Frederick Breitenfeld*
his ATTORNEY Patented Oct. 8, 1929

1,731,004

UNITED STATES PATENT OFFICE

CARL GOETHE, OF BROOKLYN, NEW YORK

CASSETTE

Application filed November 25, 1925. Serial No. 71,287.

My present invention relates generally to X-ray apparatus, and has particular reference to a cassette for exposing a sensitized film to X-rays.

The objects generally of my invention are to provide a cassette so constructed as to render the manufacture thereof extremely simple and inexpensive, and having greatly improved qualities of appearance, staunchness, and efficiency of operation.

In cassettes heretofore constructed, it has been usual to attach a separate opaque window to an independently constructed frame; but due to the necessity for providing an absolutely light proof structure, comparatively complicated constructions and extraordinary configurations have been found necessary. More particularly, cassettes of this character have been constructed wherein the frame is provided with an internal groove into which a substantially flat sheet constituting a window is inserted; and in other cases, a window has been employed which embodies specially formed upturned flanges adapted to engage the frame. In all constructions of this character, much extra time, skill, labor, and expense, have been entailed, as will be well understood.

It is an object of the present invention to provide a cassette which will entail none of these disadvantages, and the manufacture of which will be comparatively simple and inexpensive.

With the use of frames of aluminum or wood, further disadvantages arise through the necessity for further modifying the construction of such frames for the purpose of accommodating the usual hinge bearings or hinge elements for the removable cover of the cassette, and the usual spring catches for the leaf spring generally carried by the cover.

A feature of the present invention lies in constructing the frame and the window integrally of a material which is permeable by X-rays and impermeable by ordinary light rays, whereby the elimination of a joint between separate frame and window elements assures absolute light tightness, and at the same time simplifies the manufacture and provides a completed structure which is extremely staunch, efficient and of pleasing appearance.

Another feature of the invention lies in utilizing a moldable material, whereby the entire nature of manufacture and assembly is altered in a manner which is devoid of all the disadvantages and difficulties heretofore encountered.

In seeking a material having all the necessary properties and attributes essential for a structure of the character contemplated, I have found that certain artificial resins, such as phenol condensation products, are particularly suitable, but it will be understood that the particular material which is utilized may be optionally selected, provided that it embodies all the characteristics which are essential to carrying out my invention.

By the proper selection of materials I am enabled to integrally associate with the frame all the necessary auxiliary elements such as hinge bearings, spring catches, etc., whereby a unitary structure is produced.

Another feature of my invention lies in providing means for hinging the cover to the frame in such a manner that the entire cover is easily capable of yieldable movement in a direction toward or away from the window; movement of this character being desirable to permit the utilization of films of various thicknesses and of the well-known intensifying screens. A preferred embodiment contemplates the use of hinge bearings and hinge journals which are separately associated with each other and which are carried by the cover and the frame; those elements which are carried by the frame being integrally associated therewith by embedding them therein; and the last named step being accomplished during the self-same operation which produces the frame itself.

A still further feature lies in so constructing these auxiliary elements, and in associating them with the frame in such a manner, that the contour of the finished frame remains entirely devoid of projecting parts which might damage the films or screens, interfere with the free manipulation of the cover, and in other respects be sources of annoyance.

In a preferred embodiment, the hinge bearings of the hinging elements are each embedded within the frame, and they may comprise integral inserts having a surface adapted to lie flush with the inside surface of the frame, and provided with non-circular openings to receive the hinge journals.

A preferred construction contemplates also the provision of spring catches which are provided with a surface adapted to lie flush with the outer surface of the frame, and provided with anchoring extensions adapted to secure the elements to the frame.

A further feature lies in providing these spring catch elements with recesses positioned to permit expeditious manipulation of the usual leaf spring carried by the cover; and in a preferred embodiment, these recesses are positioned on opposite sides respectively of the axis assumed by the leaf spring when the latter is in engagement therewith.

Other features of my invention lie in the particular construction of the resilient means for pressing the cover against the window, and of other structural parts; and for the attainment of these numerous objects, and such other objects as may hereinafter appear or be pointed out, I have constructed a cassette embodying the features of my invention and illustrated in the accompanying drawings, in which Fig. 1 is a perspective view of a cassette constructed in accordance with my invention, showing the cover firmly held in position;

Fig. 2 is a cross-section along the line 2—2 of Fig. 1, the cover having been removed;

Fig. 3 is a plan view, on an enlarged scale, of the furthermost corner of the cassette shown in Fig. 1;

Fig. 4 is a fragmentary sectional view along the line 4—4 of Fig. 1;

Fig. 5 is a similar view taken along the line 5—5 of Fig. 1;

Fig. 6 is a perspective view of a spring catch; and

Fig. 7 is a perspective view of a preferred type of hinge bearing.

Referring to the drawings, and particularly to Figs. 1 and 2, it will be seen that the cassette comprises a window portion 10 and an integral frame portion 11 which is constituted by an upstanding peripheral flange. The thickness of the window portion 10 will depend upon the particular material utilized and must be of sufficient magnitude to impart strength and staunchness to the entire device, yet sufficiently thin to permit easy passage therethrough of X-rays. Similar considerations of strength enter into the determination of the frame dimensions, and I prefer to construct the frame of substantially square cross-section approximately 3 or 4 times as thick as the window 10. The edges of the frame 11 are suitably rounded to impart beauty and strength to the device.

The cover 12 may be of usual construction, comprising preferably a substantially flat sheet of material having dimensions which will permit it to fit easily yet snugly, within the frame 11. I provide the usual leaf spring 13 comprising a single longitudinal strip of sufficient resilence to perform its function. This strip is preferably rigidly attached to the cover at the center thereof as at 14. I prefer to provide additional resilient strips comprising the transverse strips 15 and 16, for the purpose of distributing the pressure which is exerted upon the cover to hold it against the window. The strips 15 and 16 are preferably attached at one end thereof to the cover and are positioned to underlie the spring 13 on opposite sides of the attaching point 14. They are preferably of an upturned shape whereby they will be engaged by the strip 13 when the latter is pressed downwardly, thereby carrying this downward pressure to their fixed and movable ends for the purpose of providing four distributed points of pressure.

For engagement with the ends of the spring 13 I provide spring catch elements 17, one of which is clearly illustrated in Fig. 6. Each element 17 comprises a substantially flat rectangular blank having its end portions bent downwardly to provide offset extensions 18 adapted to serve as anchoring extensions. One edge of the body portion 19 is provided with a recess 20, preferably to one side of the center of the entire element. The recess 20 is preferably arcuate to conform to the preferably semi-circular end of the strip 13. During the construction of the frame 11, the elements 17 are integrally associated therewith by embedding them in opposite sides of the frame, preferably midway of said sides. They are so embedded that the upper surface of the body portion 19 lies flush with the outer surface of the frame 11, as is clearly shown in Fig. 2; and so that the inner edge will lie flush with the inner surface of the frame 11, as clearly shown in Figs. 3 and 4. A recess 21 is provided in the frame under the body portion 19 of each element 17, for the obvious purpose of permitting the end of the strip 13 to engage under the body portion 19. This recess is preferably made of a depth coinciding with the width of the element 17, but it will be obvious that this dimension, and the other dimensions of this recess, may be altered to suit requirements. One method of providing this recess is to insert a core or plug of predetermined dimensions beneath the body portion 19 of each element 17 at the time the frame 11 is formed; and thereafter removing this core. It will be obvious that for the purpose of rendering this core removal simple, the width of the element 17 may be made coincident with the width of the frame 11, and the recess 21 may be made to extend entirely through the frame.

Fig. 1 discloses clearly how the elements 17 are so positioned with respect to the strip 13 that the recesses 20 lie on opposite sides of the axis assumed by the strip 13 when its ends engage underneath the elements 17. This axis is generally parallel to the axis of the entire device.

For the purpose of suitably hinging the cover to the frame, I provide hinge bearings 22 which are inserted in opposite sides of the frame 11, and preferably in the same sides which carry the elements 17. Referring to Fig. 7, it will be seen that the hinge bearing 22 comprises preferably a cylindrical plug having a slot therein lying substantially along a plane passing through the axis of the cylinder. This slot 23 may extend entirely through the element 22, as is preferable, or it may extend from one end thereof to a point short of the other end. Its depth is something less than a complete diameter, so that a wall 24 is produced having a function which will presently be disclosed. The element 22 is integrally associated with the frame 11 in such a manner that one face thereof lies flush with the inner surface of the frame, and during the assembly, the slot 23 may be filled with a removable plug or core in a manner similar to that described in connection with the recesses 21. Here, too, it will be understood that if desired, the cylindrical element 22 may be coextensive in length with the width of the frame 11.

One edge of the cover 12 is provided with beaded portions 25 and 26 adapted to form cylindrical bearings for pins or journals 27. Each pin 27 is preferably of a length somewhat greater than the length of its beaded portion 25 or 26, and is provided with a bent end 28 which is adapted to encounter the inner end of the beaded portion to limit the extent to which the opposite end of the pin will project from the opposite end of the beaded portion. The elements 22 are so positioned as to align the slots 23 with the pins 27, so that the latter will constitute journals which will engage within the slots 23.

It will now be obvious that the engagement between the pins 27 and the elements 22 will permit the entire cover to pivot about the axis of these pins; that the non-circular slots 23 will permit the hinge axis to shift in a vertical plane depending upon the thickness of material underneath the cover; and that the separable association between the pins and the elements 22 will permit the entire cover to be removed from the device with great facility. It will now also be obvious that the elements 22 are preferably positioned to locate the walls 24 outwardly with respect to the slots 23. This positioning of the elements 22 adds strength to the hinge by preventing engagement between the pins 27 and the material of the frame 11; in other words, the walls 24 limit the outward movement of the hinge axis.

In Figs. 4 and 5, the engagements between the spring 13 and the elements 17, and between the pins 27 and the elements 22, respectively, are clearly illustrated. I have illustratively shown a sensitized film 29 beneath the cover 12, and I have shown the cover provided with a felt cover 30; the purpose of which will be obvious and the presence of which does not constitute an essential feature of the invention.

It will thus be seen that I have provided a cassette which will have greatly improved strength, appearance, and efficiency. The integral association between not only the window 10 and the frame 11, but between the frame 11 and the elements 17 and 22, provides a unitary structure which is extremely rugged and compact. The unity of the structure greatly enhances the appearance of the device by permitting the outer surface of the window to lie flush with the outer surface of the frame 11, and by permitting the auxiliary elements to be so associated with the frame as to render the latter devoid of any projecting parts. The efficiency of the device is greatly improved not only from the standpoint of manufacture, but from the point of view of utility. The manufacture is rendered extremely simple and comparatively inexpensive, all of the elements comprising extremely simple constructions, and the moldability of the frame and window portions rendering particular configurations and labor and expense unnecessary. In use, the absolute light tightness of the device to all except X-rays is positively assured because the integral frame, extending rearwardly of the window, enables the film to be completely enclosed upon all sides except that underlying the cover by an unbroken wall of light-proof material. The added thickness of the frame prevents the X-rays from penetrating into the interior of the device through any portion except the window, and therefore, the sensitized film will be extremely safe from the standpoint of undesired light rays.

It will be obvious that various changes in the details as herein described and illustrated for the purpose of explaining the nature of my invention may be made by those skilled in the art without departing from the spirit and scope of the invention as expressed in the appended claims, and it is therefore intended that these details be interpreted as illustrative and not in a limiting sense.

I claim:—

1. A cassette comprising a window, a frame, a cover within the frame for holding a sensitized film against the window, means including hinge bearings for hinging the cover to the frame, and means including catch elements for resiliently pressing the cover against the window, said window and frame being molded as a unit of a material which is permeable to X-rays but impermeable to ordinary light rays, whereby the film will be protected from light on all sides except that beneath the cover by a homogeneous unbroken wall of light-proof material, and whereby said bearings and elements may be integrally associated with the frame by embedding them therein to form a unitary retaining structure for the film and cover.

2. A cassette comprising a window, a frame, and spring means for pressing a cover against the window, said means including catch elements carried by the frame, and said window and frame being molded as a unit of a material permeable to X-rays but impermeable to ordinary light rays, whereby the window and frame may be made integrally and the catch elements embedded in the frame to form a unitary structure.

3. A cassette, comprising a window, a frame, a cover within said frame adapted to hold a sensitized film against the window to expose it to X-rays passing through the window, and means for hinging the cover to the frame, said means including hinge bearings carried by the frame, and said window and frame being molded as a unit of a material which is permeable to X-rays and impermeable to ordinary light rays, whereby the window and frame may be integrally made and the hinge bearings integrally associated with the frame by embedding them therein to form a unitary structure.

4. A cassette comprising a window, a frame, and a cover within the frame for holding a sensitized film against the window, said window and frame being integrally made of a moldable material which is permeable to X-rays but impermeable to ordinary light rays, whereby the film will be protected from light on all sides except that beneath the cover by a homogeneous unbroken wall of light-proof material.

5. In a cassette, the combination of a frame, a window, a cover, and spring means for pressing the cover against the window, said means comprising a resilient strip carried by the cover and catch elements engageable by the ends of said strip and carried at opposite sides of the frame, said window and frame being made of moldable material whereby said elements may be embedded therein to form a unitary structure, and said elements each comprising a strip having a body portion flush with the surface of the frame, and angular anchoring ends extending into the frame, the latter being provided with openings beneath said body portions to receive the ends of said resilient strip.

6. In a cassette, the combination with a window and a cover, said window and cover being adapted to expose a sensitized film held therebetween to X-rays passing through the window, of a frame integral with said window and extending rearwardly thereof to encircle the edges of said cover.

7. In a cassette, the combination with a window and a cover, said window and cover being adapted to expose a sensitized film held therebetween to X-rays passing through the window, of a frame integral with said window and extending rearwardly thereof to encircle the edges of said cover, and means for hinging the latter to the frame, said means comprising journals and bearings, certain of which are embedded in the frame.

8. In a cassette, the combination with a solid window and a cover, said window and cover being adapted to expose a sensitized film held therebetween to X-rays passing through the window, of a frame integral with said window and extending rearwardly thereof to encircle the edges of said cover, and spring means for pressing the latter against the window, said means including catch elements embedded in said frame.

9. A cassette comprising integral frame and window portions molded of a phenol condensation product, and means for hinging a cover to the frame portion and resiliently pressing the cover against the window, said means including hinge bearings and catch elements molded into the frame portions.

In testimony whereof I affix my signature.

CARL GOETHE.